June 8, 1965 I. C. REBESCHINI 3,188,383

COLOR TELEVISION FLAT-FIELD SIGNAL GENERATOR

Filed June 2, 1961 2 Sheets-Sheet 1

INVENTOR.
Irvin C. Rebeschini
BY
Oome, McDougall & Hersh
Att'ys

June 8, 1965 I. C. REBESCHINI 3,188,383
COLOR TELEVISION FLAT-FIELD SIGNAL GENERATOR
Filed June 2, 1961 2 Sheets-Sheet 2

INVENTOR.
Irvin C. Rebeschini
BY
Dorns, McDougall & Hersh
Attys

United States Patent Office 3,188,383
Patented June 8, 1965

3,188,383
COLOR TELEVISION FLAT-FIELD SIGNAL GENERATOR

Irvin C. Rebeschini, Glen Ellyn, Ill., assignor to American Gage & Machine Company, Chicago, Ill., a corporation of Illinois Filed June 2, 1961, Ser. No. 114,425
14 Claims. (Cl. 178—5.4)

This invention relates to signal generators adapted to produce color television test signals which are particularly useful for adjusting and otherwise servicing color television receivers.

One object of the present invention is to provide a new and improved signal generator which produces color television test signals in a simplified, highly ingenious manner so that a minimum of electron tubes and other components are required in the signal generator.

Thus, it is an object of the present invention to provide a color television signal generator which is extremely inexpensive, compact and easy to manufacture.

A further object is to provide a color television signal generator which is effective in a simplified manner to produce a composite color television test signal comprising, in each cycle of the signal, a horizontal synchronizing pulse, a burst of chroma carrier, and a phase shifted chroma signal superimposed upon a brightness signal.

Another object of the invention is to provide a new and improved color television signal generator which requires only five electron tubes, and in some cases only four tubes.

Figure 1:
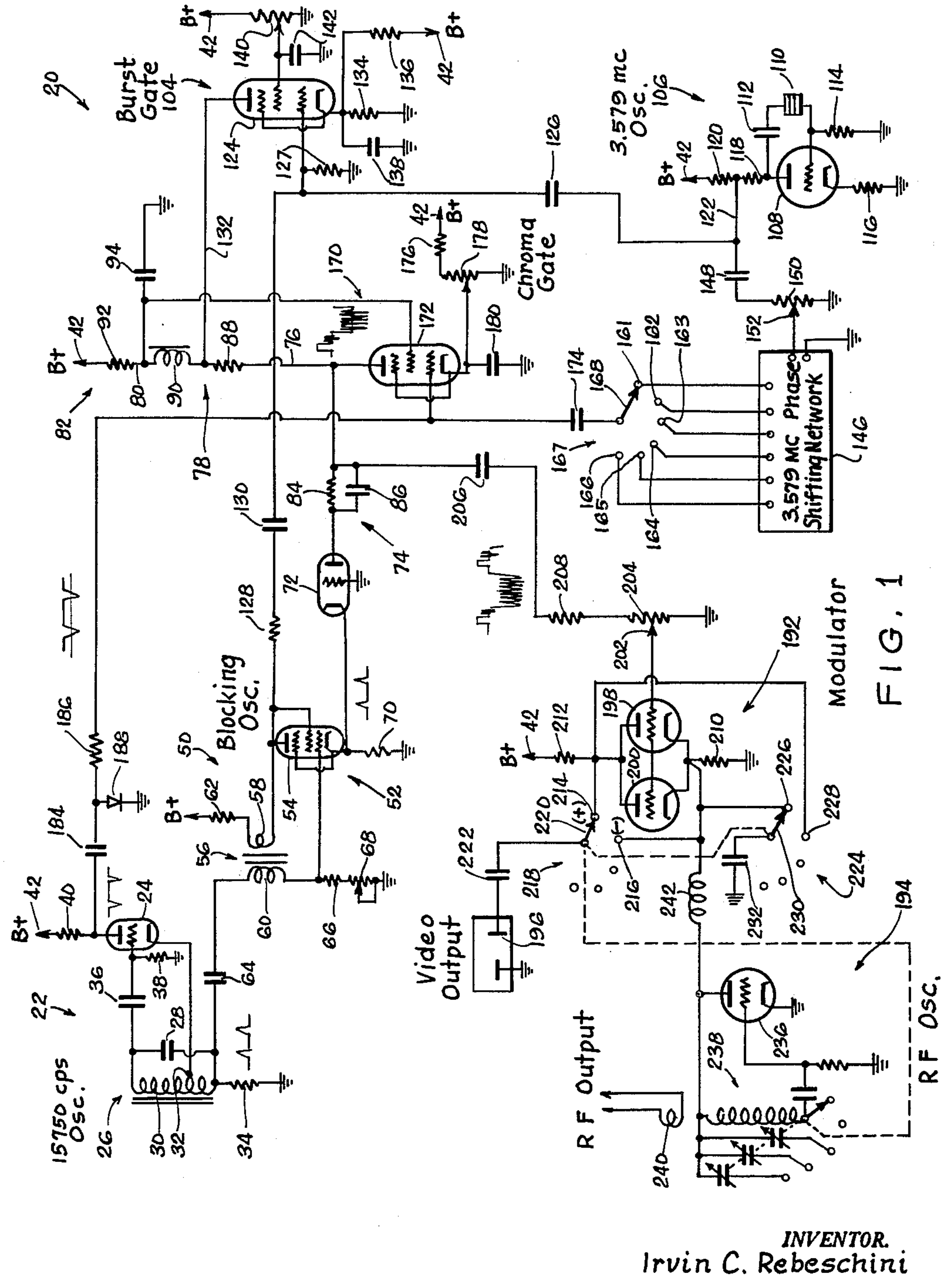

Further objects and advantages of the present invention will appear from the following description, taken with the accompanying drawings, in which:

FIG. 1 is a schematic wiring diagram of a color television signal generator to be described as an illustrative embodiment of the present invention.

FIG. 2 comprises a series of oscillograms showing signal wave forms at various points in the signal generator circuit.

Figure 3:
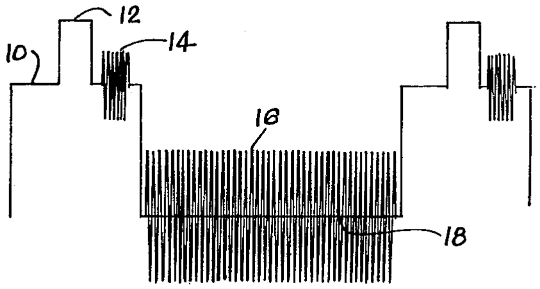

FIG. 3 is an enlarged oscillogram showing the composite color television video signal produced by the signal generator.

By way of introduction, it will be convenient to refer to the oscillogram of FIG. 3, which shows the composite video color television signal adapted to be produced by the signal generator, for use in adjusting and otherwise servicing color television receivers. It will be seen that the video signal comprises a blanking pulse 10 which also represents the black level of the television signal. A horizontal synchronizing pulse 12 is provided at or near the center of the blanking pulse 10. The synchronizing pulse 12 is of a greater amplitude than the blanking pulse and thus is sometimes described as being blacker than black. It will be understood that the synchronizing pulses are employed in the television receiver to synchronize the horizontal sweep oscillator. The synchronizing pulses 12 are produced at the rate of 15,750 cycles per second, which is the standard horizontal sweep frequency in the current television system.

Following each synchronizing pulse 12, the television signal comprises a short burst 14 of the chroma carrier, which is at a frequency of 3.579 megacycles, in the current television system. This burst 14 is employed in the color television receiver to synchronize the local chroma oscillator. The phase of the carrier in the burst 14 is taken as zero in the phase modulation system which conveys the information as to the hue of the color being transmitted. It will be noted that the burst 14 is superimposed upon the trailing portion of the blanking pulse 10.

Following the carrier burst 14, the color television signal comprises a chroma signal 16, at 3.579 megacycles superimposed upon a brightness signal 18. Normally, the chroma signal 16 is shifted in phase relative to the carrier burst 14, so as to represent the particular hue of the color being transmitted. The brightness signal 18, often known as the Y signal, conveys the necessary information as to the brightness of the color being transmitted. When the composite signal of FIG. 3 is supplied to a properly functioning color television receiver, the color being transmitted will be displayed over virtually the entire screen of the picture tube. The hue of the color may be changed by varying the phase of the chroma signal 16. The brightness may be changed by varying the amplitude of the brightness signal 18, upon which the chroma signal is superimposed.

FIG. 1 comprises a schematic wiring diagram of a signal generator 20 adapted to produce the composite video signal of FIG. 3. The signal generator 20 also has a radio frequency output which may be modulated by the video signal.

In accordance with one important feature of the present invention, the signal generator 20 is provided with a continuous wave Class C oscillator 22 to produce the horizontal repetition frequency of 15,570 cycles per second. It will be understood that the oscillator 22 may employ a transistor or other electronic amplifying device but in this case it comprises a triode electron tube 24. The frequency of the oscillator is established by a tuned oscillating circuit 26 comprising a condenser 28 in parallel with an inductance coil 30. The cathode of the tube 24 is connected to a tap 32 on the coil 30. The end of the coil 30 adjacent the tap 32 is connected to ground through a load resistor 34 of low value. In the usual manner, a coupling capacitor 36 is connected between the other end of the coil 30 and the grid tube 24. A grid leak resistor 38 is connected between the grid and ground. During the operation of the oscillator, the grid of the tube 24 is biased beyond cutoff by the grid current which flows through the resistor 38. Thus, the tube 24 conducts for a minor fraction of the oscillating cycle.

A load resistor 40 is connected between the plate of the tube 24 and a B-plus terminal 42. By means of a suitable power supply, not shown, the terminal 42 may be supplied with a positive voltage, with respect to ground, of 150 volts, or any other suitable value.

Figures 2A, 2B, 2C, 2D, 2E, 2F, 2G, 2H, 2I:
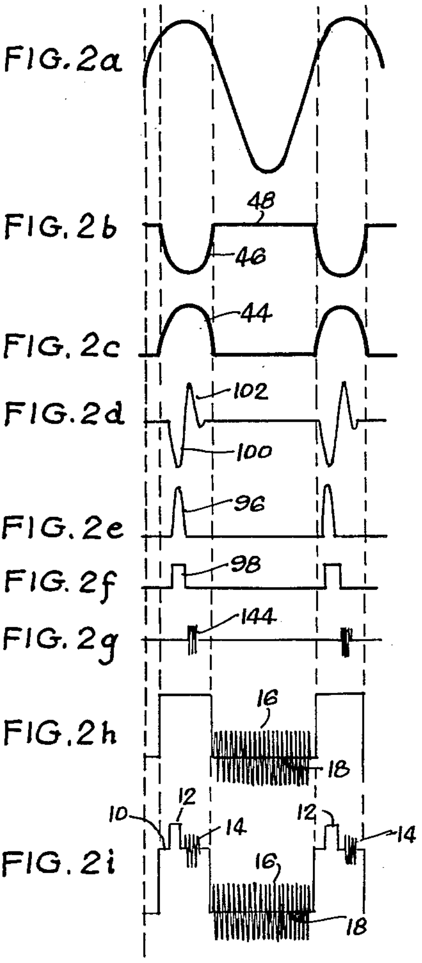

FIG. 2*a* illustrates the wave form of the signal at the grid of the Class C oscillator tube 24 with respect to ground. It will be seen that the wave form constitutes a somewhat distorted continuous wave. Inasmuch as the tube 24 is biased well beyond cutoff, the tube conducts during considerably less than half of the cycle. Thus, FIGS. 2*b* and 2*c* represent the wave forms of the signals at the plate and the cathode of the tube 24, respectively. These signals are similar but are of opposite polarities. The signal at the cathode, as shown in FIG. 2*c*, comprises a series of positive pulses 44 representing the intervals of conduction of the tube 24. These pulses 44 correspond to the clipped positive peaks of the grid signal wave form shown in FIG. 2*a*.

The signal at the plate of the tube 24 comprises negative going pulses 46 corresponding to the positive cathode pulses 44. Between the pulses 46, the plate signal of FIG. 2*b* comprises positive pulses 48 representing the intervals of nonconduction of the tube 24. Due to the Class C operation of the oscillator 22, the pulses 48 have a relatively long duration, accounting for the major portion of the signal.

In accordance with the present invention, the cathode pulses 44 of short duration are employed to generate and control the synchronizing pulses 12 and the carrier bursts 14, while the plate pulses 48 of long duration are employed to generate and control the chroma signal 16 and the brightness signal 18. This novel mode of operation will become clear as the description progresses.

The positive cathode pulses 44 are transmitted to a pulse generating and sharpening circuit 50 which comprises a blocking oscillator 52. In this case, the oscillator 52 employs a pentode electron tube 54, although it might in some cases employ a transistor or other electronic amplifier. The feedback for the oscillator 52 is provided by a transformer 56 having plate and grid windings 58 and 60. One end of the winding 58 is connected to the plate and screen grid of the tube 54. Thus, the tube 54 is connected as a triode. The other end of the plate winding 58 is connected through a load resistor 62 to the B-plus terminal 42.

One end of the grid winding 60 is connected to the grid of the tube 54. The other end of the grid winding 60 is connected to ground through a coupling capacitor 64 and the load resistor 34 in the cathode circuit of the oscillator 22. Thus, the cathode pulses 44 from the oscillator 22 are transmitted to the grid of the blocking oscillator tube 54.

Resistors 66 and 68 are connected in series between the grid of the tube 54 and ground. The resistor 68 is variable so that the blocking oscillator may be adjusted to synchronize precisely with the pulses from the continuous wave oscillator 22.

Each cathode pulse from the continuous wave oscillator 22 causes the blocking oscillator 50 to oscillate through approximately one cycle, whereupon the oscillator is blocked by the high grid bias produced by the flow of grid current through resistors 66 and 68. The tube 54 conducts through only a minor fraction of the cycle of the blocking oscillator. This short interval of conduction is employed to generate the synchronizing pulse. Thus, a load resistor 70 of low value is connected between the cathode of the tube 54 and ground. The signal at the cathode, across the load resistor 70, constitutes a sharp pulse, as shown in FIG. 2*e*. This pulse is transmitted to the output circuit by an electronic amplifier 72. In this case, the electronic amplifier 72 is a triode tube but it might be a transistor or the like. As shown, the tube 72 is connected as a grounded grid clipper. Thus, the grid of the tube 72 is grounded, while the cathode is connected directly to the cathode of the blocking oscillator tube 54 to receive the cathode pulses. The plate of the tube 72 is connected to the B-plus terminal 42 through a series circuit comprising a filter 74, a lead 76, a composite load impedance 78, a lead 80, and another filter 82. The filter 74 comprises a resistor 84 connected in parallel with a capacitor 86 of low value which readily transmits the short synchronizing pulse. It will be seen that the load impedance 78 comprises a resistor 88 in series with an inductance coil 90. The filter 82 comprises a resistor 92 connected between the B-plus terminal 42 and the lead 80, a bypass capacitor 94 being connected between the lead 80 and ground.

FIG. 2*e* illustrates the wave form of the sharpened pulse 96 at the cathode of the blocking oscillator tube 54. FIG. 2*f* illustrates the wave form of the clipped synchronizing pulse 98 at the plate of the tube 72.

The wave form of the signal at the plate of the blocking oscillator tube 54 is shown in FIG. 2*d*. It will be seen that this signal comprises a negative going pulse 100 corresponding to the positive cathode pulse 96. The pulse 100 is followed immediately by an overshooting positive pulse 102 due to the damped oscillation in the transformer 56. The damping is such that the positive pulse 102 is comparable in magnitude to the negative pulse 100. The positive pulse 102 follows immediately upon the negative pulse.

Thus, the positive pulse 102 at the plate of the blocking oscillator tube 54 follows immediately after the positive cathode pulse 96 and is of comparable duration and sharpness. These characteristics of the pulse 102 are such that it may be employed to gate the carrier burst 14 for the composite output signal. Thus, the signals from the plate of the blocking oscillator tube 54 are transmitted to a burst gate 104 which receives a continuous wave carrier from a carrier oscillator 106 operating at 3.579 megacycles, which is the standard chroma carrier frequency in the current television system. It will be seen that the oscillator 106 is of conventional construction. Thus, it comprises an electronic amplifier device in the form of a triode tube 108. An oscillatory crystal frequency standard 110 is connected in series with a coupling capacitor 112 between the plate and the grid of the tube 108. A grid bias resistor 114 is connected between the grid and ground. The cathode of the tube 108 is connected to ground through a bias resistor 116.

In the plate circuit, load resistors 118 and 120 are connected in series between the plate of the tube 108 and the B-plus terminal 42. The output from the oscillator 106 is taken by a lead 122 connected to the junction between the resistors 118 and 120.

It will be seen that the burst gate 104 comprises an electronic amplifier device in the form of a pentode tube 124. A coupling capacitor 126 of small value is connected between the output lead 122 of the oscillator 106 and the grid of the tube 124. A grid resistor 127 is connected between the grid and ground. The pulse signals from the plate of the blocking oscillator 50 are coupled to the grid of the tube 124 by a resistor 128 connected in series with a coupling capacitor 130. By means of a lead 132, the plate of the tube 124 is connected to the junction between the resistor 88 and the inductance coil 90.

In the absence of gating pulses from the blocking oscillator 50, the burst gate tube 124 is biased beyond cutoff by a voltage dividing arrangement comprising a resistor 134 connected between the cathode of the tube 124 and ground, and a resistor 136 connected between the B-plus terminal 42 and the cathode of the tube 124. A bypass capacitor 138 is connected across the cathode resistor 134.

When the positive pulse 102 is received from the blocking oscillator 50, the gate tube 124 is rendered conductive so that it transmits a burst of the carrier signal to the output circuit. The height of the burst signal may be regulated by adjusting the voltage on the screen grid of the gate tube 124. Thus, the screen grid is connected to the slider of a potentiometer 140 connected between the B-plus terminal 42 and ground. A bypass capacitor 142 is connected between the screen grid and ground.

FIG. 2*g* illustrates the burst signals 144 at the plate of the gate tube 124. It will be noted that the timing of the burst signals corresponds to the peaks of the positive pulses 102 at the plate of the blocking oscillator tube 54.

To develop chroma carrier signals of varying phases, the carrier signal from the oscillator 106 is also transmitted to a selective phase shifting network 146. Thus, a coupling capacitor 148 and a potentiometer 150 are connected in series between the lead 122 and ground. The slider 152 of the potentiometer is connected to the input of the phase shifting network.

In the present case, the phase shifting network 146 has a series of output terminals which are connected to the successive contact points 161, 162, 163, 164, 165 and 166 of a selector switch 167 having a movable contactor 168 which is engageable with each of the contacts 161–166.

Chroma signals of different phases are supplied by the phase shifting network 146 to the various contacts 161–166. Thus, for example, the contacts 161–166 may be supplied with the following standard chroma signals:

161, the yellow signal; 162, the I signal; 163, the Q signal; 164, the B–Y signal; 165, the R–Y signal; 166, the G–Y ∠90° signal.

The transmission of the selected chroma signal to the output circuit is controlled by a chroma gate 170 which comprises an electronic amplifier in the form of a pentode electron tube 172. A coupling capacitor 174 is connected between the movable contactor 168 and the grid of the gate tube 172. The grid of the tube 172 is biased beyond cutoff by a voltage dividing arrangement comprising a resistor 176 and a potentiometer 178 connected in series between the B-plus terminal 42 and ground. The slider of the potentiometer 178 is connected to the cathode of the gate tube 172. Thus, the bias on the grid of the tube 172 may be varied by adjusting the potentiometer 178. This adjustment changes the level of the brightness signal 18 in the composite output. A bypass capacitor 180 is connected between the cathode of the tube 172 and ground.

It will be seen that the plate of the gating tube 172 is connected to the lead 76 in the output circuit. Voltage is supplied to the screen grid of the tube 172 from the lead 80 at the output of the B-plus filter 82.

In accordance with the present invention, the gating pulses for the chroma gate 172 are derived from the plate of the Class C continuous wave oscillator tube 24. As already indicated, the positive pulses 48 at the plate of the tube 24 correspond to the intervals of nonconduction of the tube, while the negative pulses 46 correspond to the intervals of conduction. In this case, the pulses are transmitted from the plate of the tube 24 to the grid of the tube 172 by means of a coupling capacitor 184 connected in series with a resistor 186. A diode 188 is connected from the junction of the capacitor 184 and the resistor 186 to ground. During the negative pulses 46, the gating tube 172 is cut off so that the chroma signal is not transmitted to the output. During the positive pulses 48 the tube becomes conductive so that the chroma signal is transmitted.

Thus, FIG. 2*h* represents the signal at the plate of the chroma gate tube 172, in the absence of the synchronizing pulse and the carrier burst signals. It will be seen that the gating pulses from the oscillator tube 24 produce the chroma carrier 16, also shown in FIG. 3, superimposed on the brightness signal 18. FIG. 2*i* represents the signal at the plate of the tube 172 with the synchronizing pulses and the carrier bursts added. This is the complete video output signal and corresponds to the representation of FIG. 3.

In this case, the composite video signal is transmitted to a modulator 192 which may be employed either to modulate a radio frequency oscillator 194, or to supply direct video output power between a video output terminal 196 and ground. As shown, the modulator 192 comprises electronic amplifiers in the form of triode tubes 198 and 200 connected in parallel. The grids of the tubes 198 and 200 are connected to the slider 202 of a potentiometer 204 which may be adjusted to control the level of the video output. A coupling capacitor 206 and a resistor 208 are connected between the plate of the tube 172 and one side of the potentiometer 204, the other side of the potentiometer being grounded.

The video output terminal 196 may be connected to either the cathodes or the plates of the tubes 198 and 200, so as to provide either a positive going or a negative going video signal. Thus, a load resistor 210 is connected between ground and the cathodes of the tubes 198 and 200. Similarly, a load resistor 212 is connected between the B-plus terminal 42 and the plates of the tubes 198 and 200. The plates and cathodes of the tubes 198 and 200 are connected to contacts 214 and 216 of a selector switch 218 having a contactor 220 which is engageable with either of the contacts. A coupling capacitor 222 is connected between the contactor 220 and the video output terminal 196.

Another selector switch 224 also has contacts 226 and 228 connected to the cathodes and the plates of the tubes 198 and 200. A contactor 230 is engageable with either of the contacts 226 and 228. It will be seen that a bypass capacitor 232 is connected between the contactor 230 and ground. The switches 218 and 224 are ganged together so that the bypass capacitor 232 is connected to the cathodes when the video output terminal is connected to the plates of the tubes 198 and 200. When the video output terminal 196 is connected to the cathodes of the tubes, the bypass capacitor 232 is connected to the plates.

The oscillator 194 may be of conventional construction and may include an electronic amplifier device in the form of a triode tube 236. An oscillating tuned circuit 238 is connected between the plate and the grid of the tube 236. In this case, the cathode of the tube 236 is grounded. The radio frequency output signal may be derived by an output coil 240 coupled to the tuned circuit 238.

As shown, the modulator 192 is connected to the oscillator 194 by means of a radio frequency choke coil 242 connected between the plate of the oscillator tube 236 and the cathodes of the modulator tubes 198 and 200. Thus, the power required to modulate the oscillator 194 is derived from the cathode circuit of the modulator 192.

While the illustrated signal generator employs nine electron tube sections, the total number of tubes may readily be reduced to five by employing dual section tubes. Thus, the continuous wave oscillator tube 24 and the chroma gate tube 172 take the form of sections of a triode-pentode tube. Similarly, the blocking oscillator tube 54 and the clipper tube 72 may comprise sections of another triode-pentode tube. Still another triode-pentode tube may be employed to supply the burst gate tube 124 and the modulator tube 198. The other modulator tube 200 and the oscillator tube 236 may comprise the sections of a twin triode tube.

A still further reduction in the number of tubes may be accomplished by employing only one tube section for the modulator. Such tube section may comprise a pentode connected as a triode and associated with the radio frequency oscillator tube in a single triode-pentode tube. The carrier oscillator may then be associated with the burst gate in a single triode-pentode tube. With this arrangement, the signal generator employs three triode-pentode tubes and one twin triode tube, making a total of only four tubes.

To review the operation of the generator, it will be recalled that the horizontal sweep frequency is generated by the continuous wave Class C oscillator 22. Pulses corresponding to the intervals of conduction of the oscillator tube 24 are derived from the cathode of the tube and employed to generate and control the synchonizing pulses 12 and the carrier bursts 14. Pulses corresponding to the intervals of nonconduction of the oscillator tube 24 are derived from the plate of the tube and are employed to develop and control the brightness signal 18 and the superimposed chroma signal 16. The pulses from the plate of the oscillator tube 24 are transmitted to the grid of the chroma gate tube 172 which thus is rendered conductive so as to transmit the chroma signal during the desired portion of the signal.

The relatively brief pulses from the cathode of the continuous wave oscillator 22 are sharpened by the blocking oscillator 50 and the clipper tube 72 to form the synchonizing pulses, which are derived from the cathode of the blocking oscillator tube 54. The closely following overshoot pulses at the plate of the blocking oscillator tube 54 are employed to render the tube 124 conductive so as to gate the carrier bursts to the output circuit, in the properly timed trailing relation to the synchronizing pulses. This novel mode of operation accounts for the unusual simplicity and economy of the color television signal generator. Of course, the present invention is not limited to any particular set of values but the following table of values may be of assistance in practicing the present invention:

*Resistors*

| Reference number: | Value—ohms |
|---|---|
| 34 | 820 |
| 38 | 150K |
| 40 | 22K |
| 62 | 820 |
| 66 | 51K |
| 68 | 100K |
| 70 | 220 |
| 84 | 10K |
| 88 | 2200 |
| 92 | 470 |
| 114 | 470K |
| 116 | 500 |
| 118 | 10K |
| 120 | 5K |
| 127 | 47K |
| 134 | 82K |
| 136 | 47K |
| 140 | 100K |
| 176 | 100K |
| 178 | 2K |
| 186 | 27K |
| 204 | 2K |
| 208 | 10K |
| 210 | 820 |
| 212 | 150 |

*Capacitors*

| Reference number: | | Value |
|---|---|---|
| 28 | mf | .004 |
| 36 | mmf | 680 |
| 62 | mmf | 820 |
| 64 | mmf | 560 |
| 86 | mmf | 47 |
| 94 | mf | 20 |
| 112 | mf | .02 |
| 126 | mmf | 10 |
| 138 | mf | 50 |
| 142 | mf | .1 |
| 174 | mmf | 100 |
| 184 | mf | .01 |
| 206 | mf | .1 |
| 222 | mf | .1 |
| 232 | mf | 10 |

It will be understood that transistors or the like may be substituted for the illustrated tubes, as desired. Various other modifications, alternative constructions and equivalents may be employed without departing from the true spirit and scope of the invention as exemplified in the foregoing description and defined in the following claims.

I claim:

1. A signal generator for producing color television test signals, said generator comprising a Class C oscillator operating at the horizontal synchronizing frequency and including an electronic amplifier device which is conductive for a minor fraction of the cycle of said oscillator, first means for deriving pulse signals from said electronic amplifier device corresponding to the intervals of conduction thereof, a blocking oscillator connected to said first means and operable by said pulse signals for producing first and second successive sharpened pulses of opposite polarities, an output circuit, means for transmitting said first sharpened pulse to said output circuit to provide horizontal synchronizing pulses, a carrier oscillator, a burst gate connected between said carrier oscillator and said output circuit, third means for transmitting said second sharpened pulse from said blocking oscillator to said burst gate to activate said burst gate so that a burst of carrier signal will be transmitted to said output circuit following each synchronizing pulse, a phase shifting device connected to said carrier oscillator and selectively operable to provide chroma signals corresponding to said carrier but of variably shifted phase, a chroma gate connected between said phase shifting device and said output circuit, and fourth means for transmitting pulses to said chroma gate from said Class C oscillator corresponding to the intervals of nonconduction of said electronic amplifier device to provide a chroma signal superimposed upon a brightness signal following each burst of carrier signal.

2. In a signal generator for producing color television test signals, the combination comprising a continuous wave oscillator operating at the horizontal synchronizing frequency and including an electronic device which is conductive for a minor fraction of the cycle of the oscillator, first means for deriving first pulses from said oscillator corresponding to the intervals of conduction of said electronic device, a pulse sharpener connected to said first means for producing second and third successive sharpened pulses of opposite polarities in response to each of said first pulses, an output circuit, means for transmitting said second sharpened pulse to said output circuit to provide a synchronizing pulse, a carrier oscillator, a burst gate connected between said carrier oscillator and said output circuit, means for transmitting said second sharpened pulse to said burst gate to provide a burst of carrier signal in said output circuit following said synchronizing pulse, a selectively adjustable phase shifting network connected to said carrier oscillator for providing chroma signals, a chroma gate connected between said phase shifting device and said output circuit, and means for transmitting pulses from said continuous wave oscillator to said chroma gate corresponding to the intervals of nonconduction of said electronic device so as to produce a chroma signal superimposed upon a brightness signal following each burst of carrier signal.

3. In a signal generator for producing color television test signals, the combination comprising a continuous wave oscillator operating at the horizontal synchronizing frequency and including an electron discharge device having a plate and a cathode, said device being conductive for a minor fraction of the cycle of said oscillator, a blocking oscillator including a second electron discharge device having a plate, a cathode and a grid, means for deriving first pulses from the cathode of said first-mentioned electron discharge device corresponding to the intervals of conduction thereof and for transmitting said first pulses to said grid of said blocking oscillator, said blocking oscillator being operative to produce a sharpened positive pulse at the cathode of said blocking oscillator corresponding to each of said first pulses, an output circuit, means for transmitting said sharpened positive pulse to said output circuit to produce a synchronizing pulse therein, said blocking oscillator being operative to produce a negative pulse followed by a second positive pulse at the plate thereof in response to each of said first pulses, said second positive pulse closely following said first positive pulse, a carrier oscillator, a burst gate connected between said carrier oscillator and said output circuit, means for transmitting said second positive pulse from said plate of said blocking oscillator to said burst gate so as to open said burst gate and produce a burst of carrier signal in said output circuit following each of said synchronizing pulses, an adjustable phase shifter connected to said carrier oscillator for producing chroma signals, a chroma gate connected between said phase shifter and said output circuit, and means for transmitting pulses from said plate of said continuous wave oscillator to said chroma gate corresponding to the intervals of nonconduction of said first electron device to open said chroma gate and produce a chroma signal superimposed upon a brightness signal following each burst of carrier signal.

4. In a signal generator for producing color television test signals, the combination comprising a Class C oscillator operating at the horizontal synchronizing frequency and having an electronic device conductive for a minor fraction of the cycle of said oscillator, first means for deriving pulses from said oscillator corresponding to the relatively brief intervals of conduction of said electronic device, second means for deriving relatively long pulses corresponding to intervals of nonconduction of said electronic device, third means connected to said first means for producing a synchronizing pulse and a delayed carrier burst in response to each of the pulses from said first means, fourth means connected to said second means for producing a train of chroma signals superimposed on a brightness signal in response to each of the pulses from said second means, and means for combining the signals produced by said third and fourth means.

5. In a signal generator for producing color television test signals, the combination comprising a first oscillator operating at the horizontal synchronizing frequency and operative to produce first relatively brief pulses and second pulses of longer duration occurring in the time intervals between said first pulses, a blocking oscillator connected to said first oscillator for receiving said first pulses therefrom, said blocking oscillator comprising means for generating a synchronizing pulse and a delayed gating pulse in response to each of said first pulses, an output circuit, means for transmitting said synchronizing pulse to said output circuit, a carrier oscillator, a burst gate connected to said carrier oscillator and said output circuit, means for transmitting said delayed gating pulse to said burst gate to open said gate so as to transmit carrier bursts to said output circuit, means including a chroma gate connected between said carrier oscillator and said output circuit, and means for transmitting said second pulses to said chroma gate for opening said chroma gate so as to supply chroma signals to said output circuit.

6. In a signal generator for producing color television test signals, the combination comprising a Class C oscillator operating at the horizontal synchronizing frequency and including an electron device conductive during a minor fraction of the cycle of said oscillator, first means for deriving first pulses from said oscillator and corresponding to the intervals of conduction of said electron device, second means for deriving second pulses from said oscillator and corresponding to the intervals of nonconduction of said electron device, means connected to said first means for generating a synchronizing pulse and a delayed gating pulse in response to each of said first pulses, an output circuit, means for transmitting said synchronizing pulse to said output circuit, a carrier oscillator, a burst gate connected between said carrier oscillator and said output circuit, means for transmitting said delayed gating pulse to said burst gate, means including a chroma gate connected between said carrier oscillator and said output circuit, and means connected between said second means and said chroma gate for transmitting said second pulses to said chroma gate so as to gate a chroma signal to said output circuit in accordance with said second pulses.

7. In a signal generator for producing color television test signals, the combination comprising a Class C oscillator operating at the horizontal repetition frequency and including an electron device conductive for a minor fraction of the cycle of said oscillator, first means for deriving first pulses from said oscillator and corresponding to the intervals of conduction of said electron device, second means for deriving second pulses from said oscillator and corresponding to the intervals of nonconduction of said electron device, third means connected to said first means for producing a synchronizing pulse and a delayed pulse in response to each of said first pulses, fourth means connected to said last mentioned means for producing a carrier burst in response to each delayed pulse, fifth means connected to said second means for producing an interval of chroma signal in response to each of said second pulses, and means connected to said third, fourth and fifth means for combining said synchronizing pulse, said carrier burst and said chroma signal into a single composite output signal.

8. In a signal generator for producing color television test signals, the combination comprising a Class C oscillator operating at the horizontal synchronizing frequency and having an electronic device conductive for a minor fraction of the cycle of said oscillator, first means for deriving pulses from said oscillator corresponding to the relatively brief intervals of conduction of said electronic device, second means for deriving relatively long pulses corresponding to intervals of nonconduction of said electronic device, third means connected to said first means for producing a synchronizing pulse and a delayed carrier burst in response to each of the pulses from said first means, fourth means connected to said second means for producing an interval of chroma signals superimposed on a brightness signal in response to the pulses from said second means, and output means connected to said third and fourth means for combining said synchronizing pulses, carrier bursts, chroma signals and brightness signals.

9. In a signal generator for producing color television test signals, the combination comprising a first oscillator operating at the horizontal synchronizing frequency and operative to produce first relatively brief pulses and second pulses of longer duration occurring in the time intervals between said first pulses, first means connected to said first oscillator for producing a synchronizing pulse and a delayed gating pulse in response to each of said first pulses, an output circuit, second means for transmitting said synchronizing pulse from said first means to said output circuit, a carrier oscillator, a burst gate connected between said carrier oscillator and said output circuit, third means for transmitting said delayed gating pulse to said burst gate to open said gate so as to transmit carrier bursts to said output circuit, fourth means including a chroma gate connected between said carrier oscillator and said output circuit, and means for transmitting said second pulses from said oscillator to said chroma gate for opening said chorma gate so as to supply chroma signals to said output circuit.

10. In a signal generator for producing color television test signals, the combination comprising a Class C oscillator operating at the horizontal synchronizing frequency and including an electron device conductive during a minor fraction of the cycle of said oscillator, first and second means for deriving first and second pulses of opposite sign from said oscillator and corresponding to the intervals of conduction of said electron device, means connected to said first means for generating a synchronizing pulse and a delayed gating pulse in response to each of said first pulses, an output circuit, means for transmitting said synchronizing pulse to said output circuit, a carrier oscillator, a burst gate connected between said carrier oscillator and said output circuit, means for transmitting said delayed gating pulse to said burst gate, means including a chroma gate connected between said carrier oscillator and said output circuit, and means connected between said second means and said chroma gate for transmitting said second pulses to said chroma gate so as to gate a chroma signal to said output circuit in accordance with the spaces between said second pulses.

11. In a signal generator for producing color television test signals, the combination comprising a Class C oscillator operating at the horizontal repetition frequency and including an electron device conductive for a minor fraction of the cycle of said oscillator, first and second means for deriving first and second pulses of opposite sign from said oscillator and corresponding to the intervals of conduction of said electron device, means connected to said first means for producing a synchronizing pulse and a delayed pulse in response to each of said first pulses, means connected to said last mentioned means for producing a carrier burst in response to each delayed pulse, means connected to said second means for producing intervals of chroma signal corresponding to the intervals between said second pulses, and means for combining said synchronizing pulse, said carrier burst and said chroma signal into a single composite output signal.

12. In a signal generator for producing color television test signals, the combination comprising a continuous wave Class C oscillator operating at the horizontal synchronizing frequency and including an electronic device which is conductive for a minor fraction of the cycle of the oscillator, first and second means for deriving first and second pulses of opposite sign from said oscillator corresponding to the intervals of conduction of said electronic device, a pulse sharpener connected to said first means for producing successive sharpened third and fourth pulses of opposite polarities in response to each of said first pulses, an output circuit, means for transmitting said sharpened third pulse to said output circuit to provide a synchronizing pulse, a carrier oscillator, a normally closed burst gate connected between said carrier oscillator and said output circuit, means for transmitting said sharpened fourth pulse to said burst gate to open said gate and provide a burst of carrier signal in said output circuit following said synchronizing pulse, a selectively adjustable phase shifting network connected to said carrier oscillator for providing chroma signals, a normally open chroma gate connected between said phase shifting device and said output circuit, and means for transmitting said second pulses from said continuous wave oscillator to said chroma gate so as to close said gate and produce a chroma signal superimposed upon a brightness signal following each burst of carrier signal.

13. In a signal generator for producing color television test signals, the combination comprising a continuous wave Class C oscillator operating at the horizontal synchronizing frequency and including an electronic device which is conductive for a minor fraction of the cycle of the oscillator, said electronic device having first and second electrodes of opposite polarity, first and second means for deriving first and second pulses of opposite sign from said first and second electrodes and corresponding to the intervals of conduction of said electronic device, a pulse sharpener connected to said first means for producing successive sharpened third and fourth pulses of opposite polarities in response to each of said first pulses, an output circuit, means for transmitting said sharpened third pulse to said output circuit to provide a synchronizing pulse, a carrier oscillator, a burst gate connected between said carrier oscillator and said output circuit, means for transmitting said sharpened fourth pulse to said burst gate to provide a burst of carrier signal in said output circuit following said synchronizing pulse, a phase shifting network connected to said carrier oscillator for providing chroma signals, a chroma gate connected between said phase shifting device and said output circuit, and means for transmitting said second pulses from said second means to said chroma gate so as to produce a chroma signal superimposed upon a brightness signal following each burst of carrier signal.

14. In a signal generator for producing color television test signals, the combination comprising a continuous wave Class C oscillator operating at the horizontal synchronizing frequency and including an electron discharge device having a plate and a cathode, said device being conductive for a minor fraction of the cycle of said oscillator, a blocking oscillator including a second electron discharge device having a plate, a cathode and a grid, means for deriving first pulses of positive sign from the cathode of said first mentioned electron discharge device corresponding to the intervals of conduction thereof and for transmitting said first pulses to said grid of said blocking oscillator, said blocking oscillator being operative to produce a sharpened positive pulse at the cathode of said blocking oscillator corresponding to each of said first pulses, an output circuit, means for transmitting said sharpened positive pulse to said output circuit to produce a synchronizing pulse therein, said blocking oscillator being operative to produce a negative pulse followed by a second positive pulse at the plate thereof in response to each of said first pulses, said second positive pulse closely following said first positive pulse, a carrier oscillator, a burst gate connected between said carrier oscillator and said output circuit, means for transmitting said second positive pulse from said plate of said blocking oscillator to said burst gate so as to open said burst gate and produce a burst of carrier signal in said output circuit following each of said synchronizing pulses, an adjustable phase shifter connected to said carrier oscillator for producing chroma signals, a chroma gate connected between said phase shifter and said output circuit, and means for deriving and transmitting negative pulses from said plate of said continuous wave oscillator to said chroma gate corresponding to the intervals of conduction of said first electron discharge device to close said chroma gate and produce a chroma signal superimposed upon a brightness signal following each burst of carrier signal.

References Cited by the Examiner

UNITED STATES PATENTS

| | | | |
|---|---|---|---|
| 2,683,187 | 7/54 | Rynn et al. | 178—6 |
| 2,858,368 | 10/58 | Kennedy | 178—6 |
| 2,943,144 | 6/60 | Wlasuk | 178—6 |

DAVID G. REDINBAUGH, *Primary Examiner.*

ROBERT SEGAL, *Examiner.*